(Model.)
E. S. WHEELER.
COFFIN SCREW.
No. 244,702.   Patented July 19, 1881.
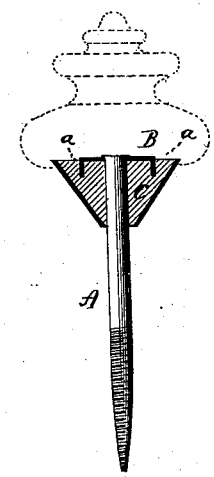
Witnesses.
Elonzo S. Wheeler
Inventor
By atty.

UNITED STATES PATENT OFFICE.

ELONZO S. WHEELER, OF WESTPORT, CONNECTICUT, ASSIGNOR OF ONE-HALF TO JONATHAN E. WHEELER, OF SAME PLACE.

COFFIN-SCREW.

SPECIFICATION forming part of Letters Patent No. 244,702, dated July 19, 1881.

Application filed May 12, 1881. (Model.)

*To all whom it may concern:*

Be it known that I, ELONZO S. WHEELER, of Westport, in the county of Fairfield and State of Connecticut, have invented a new Improvement in Coffin-Screws; and I do hereby declare the following, when taken in connection with the accompanying drawings and the letters of reference marked thereon, to be a full, clear, and exact description of the same, and which said drawings constitute part of this specification, and represent, in—

Figure 1, a vertical central section, showing the connection of the screw with the head; Fig. 2, a perspective view of the screw.

This invention relates to an improvement in that class of screws which are provided with a knob-like ornamental head, used for coffin-screws and other purposes, and coming under the general classification of coffin or knob screws, with special reference to that class of screws in which the body of the screw is made from a semi-soft material, such as wood, paper, &c., or such as may be made from that material, and as seen in Letters Patent granted to me November 9, 1880.

In the usual construction the screw employed is an ordinary wire screw, with the head end flattened or made of irregular shape to fit a correspondingly-shaped hole through the head. As the screw must be turned by the head it frequently occurs that the resistance of the screw to being turned is so great that the head will break away from the irregular shape of the end of the screw, so as to turn thereon, and thus destroy the screw.

The object of this invention is to overcome this difficulty; and it consists in a knob or head made in parts, combined with a screw extending through the lower part, said screw having a disk at its head end provided with spurs upon its outer edge, and so as to prevent the parts of the head from turning thereon.

A represents the screw, which is made of size and length according to the use to which the screw is to be applied. On the head end of the screw a metal disk, B, is secured, preferably by a square or irregular shaped perforation in the center of the disk set onto a corresponding shoulder on the end of the screw, and riveted so as to firmly attach the two parts. On the edge of the disk B one or more pointed spurs are formed and turned downward or upward, so that when the screw is introduced through the head C, as seen in Fig. 1, the spurs will be pressed into the material of the head, and thus make a firm connection between the head and the screw.

In Fig 1 only the lower part of the head is shown in full, broken lines indicating the outline of the complete head.

By this construction the power is applied to the screw so much farther (radially) from its axis that the resistance is more easily overcome, and disengagement from the body is almost impossible.

I do not broadly claim a screw having a head provided with teeth to enter the material to which the screw is introduced, as such I am aware is not new; but What I do claim is—

The herein-described knob-screw, consisting in a knob or head made in parts, combined with a screw extending through the lower part, said screw having a disk at its head end provided with spurs upon its outer edge, and so as to prevent the lower part of the head from turning thereon, substantially as described.

ELONZO S. WHEELER.

Witnesses:
MOSES W. WILSON,
OLIVER W. WELD.